Oct. 28, 1941.  H. G. CUNNINGHAM ET AL  2,260,299
MOTION PICTURE PROJECTOR AND CONTROL SYSTEM THEREFOR
Filed Jan. 30, 1939  4 Sheets-Sheet 1
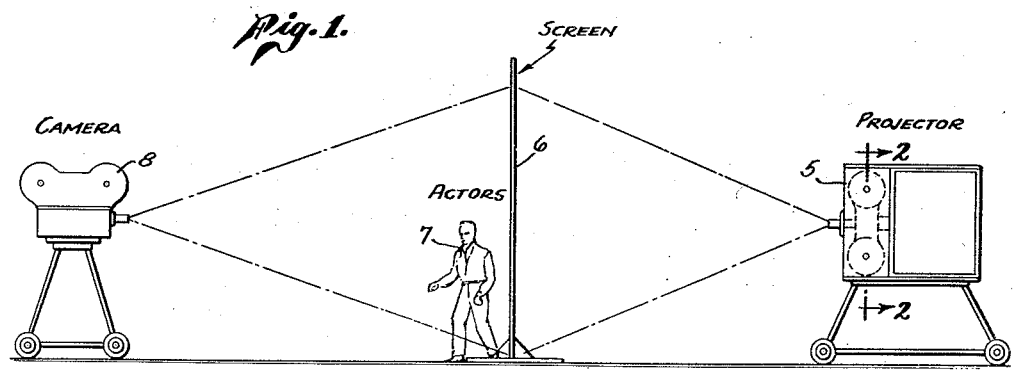
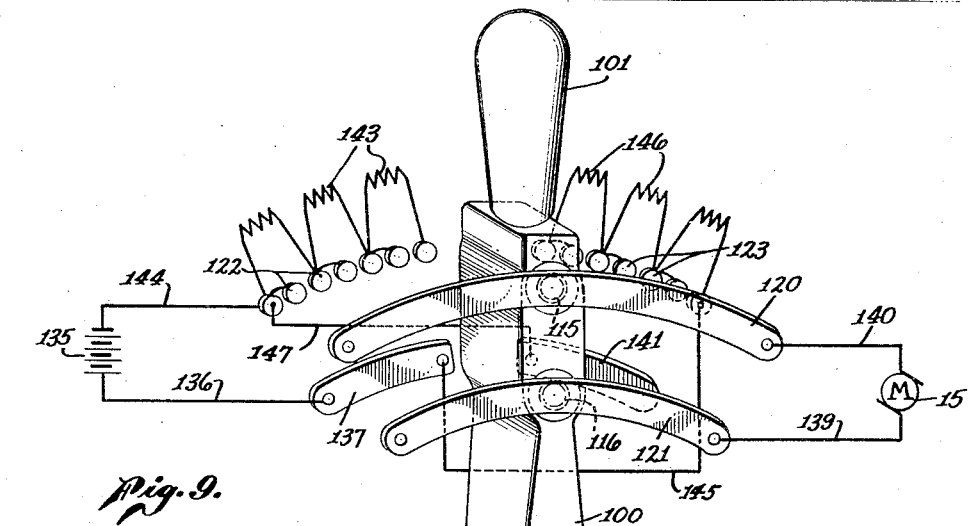
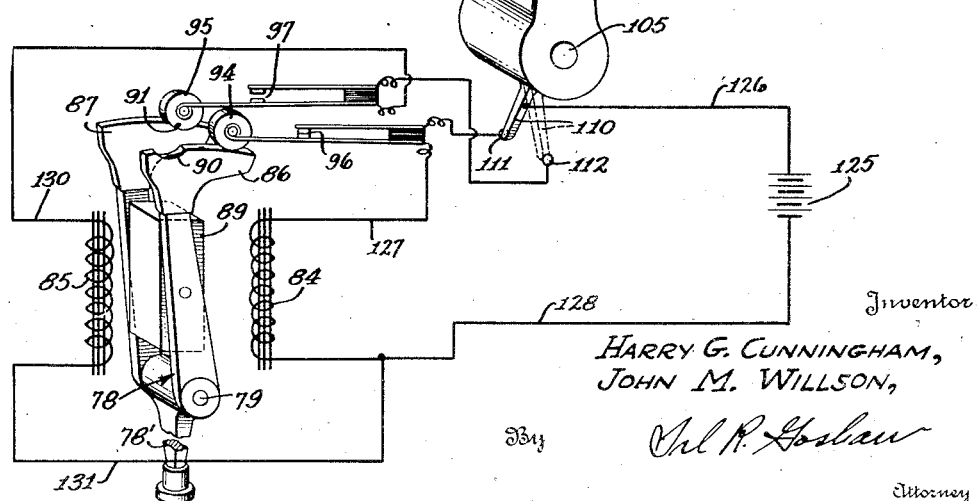
Inventor
HARRY G. CUNNINGHAM,
JOHN M. WILLSON,

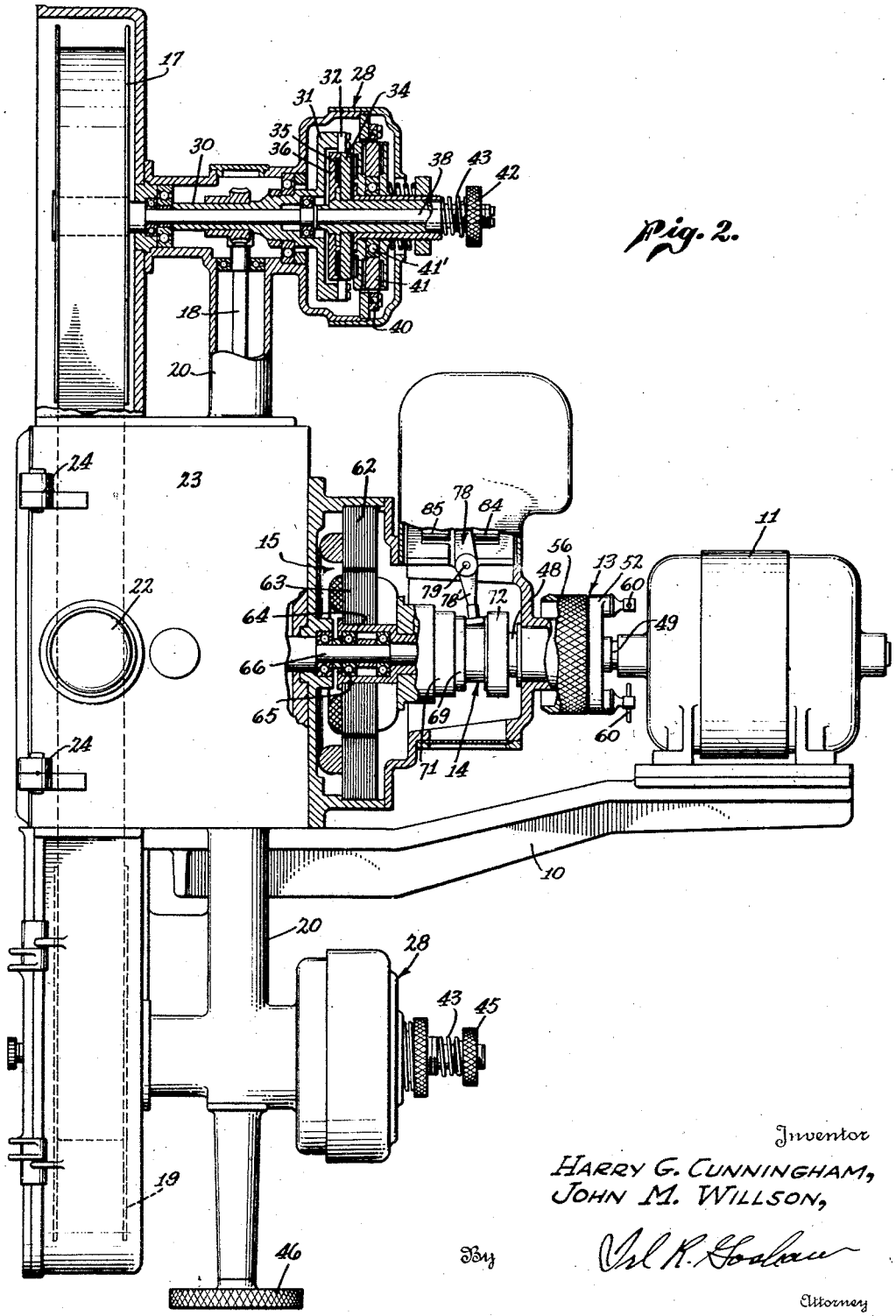

Oct. 28, 1941.  H. G. CUNNINGHAM ET AL  2,260,299
MOTION PICTURE PROJECTOR AND CONTROL SYSTEM THEREFOR
Filed Jan. 30, 1939  4 Sheets-Sheet 3
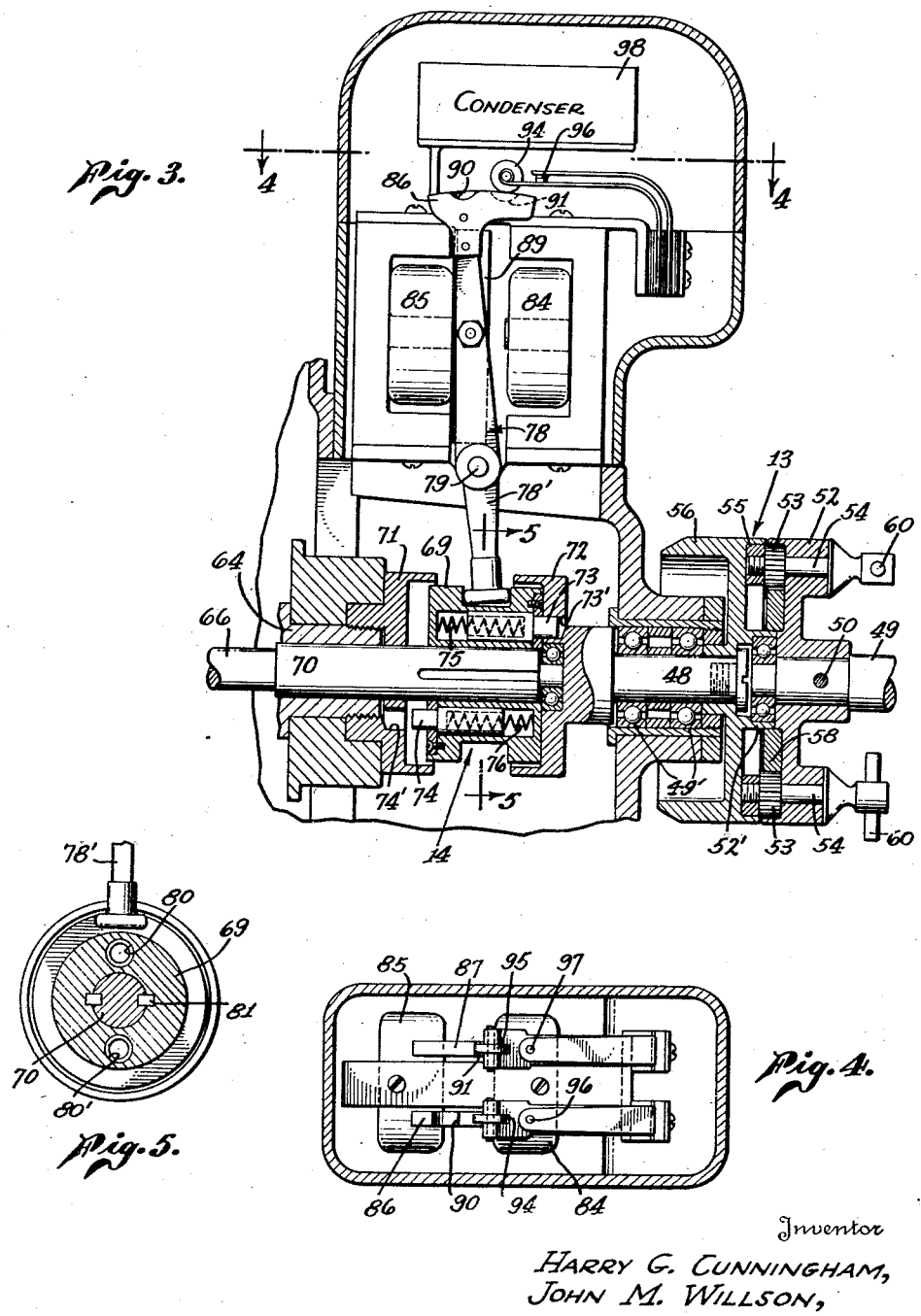
Inventor
HARRY G. CUNNINGHAM,
JOHN M. WILLSON,
By Vrl R. Goshaw
Attorney

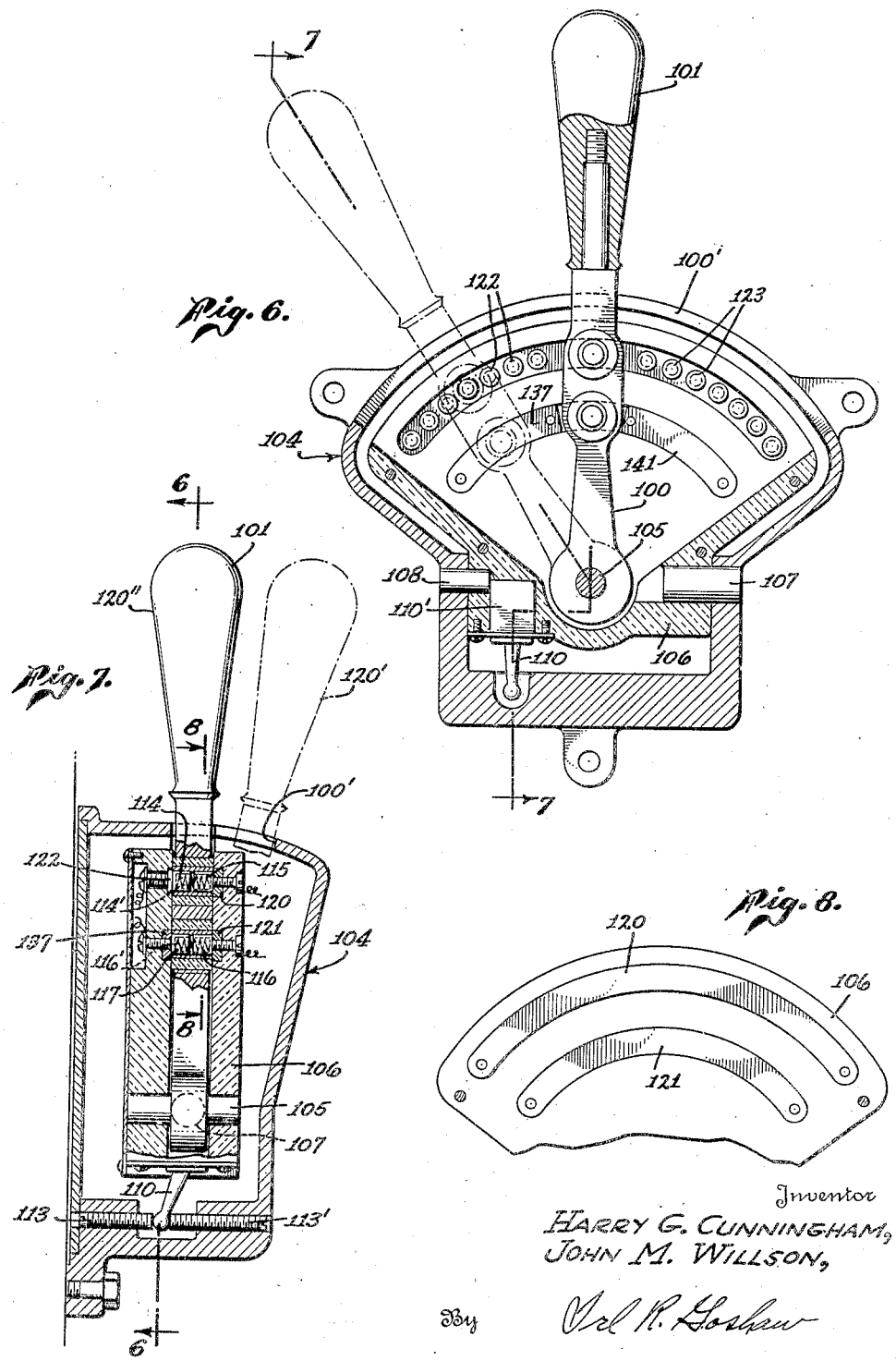

Patented Oct. 28, 1941

2,260,299

UNITED STATES PATENT OFFICE 2,260,299

MOTION PICTURE PROJECTOR AND CONTROL SYSTEM THEREFOR

Harry G. Cunningham, Hollywood, and John M. Willson, Burbank, Calif., assignors to Radio Keith Orpheum Corporation, a corporation of Maryland Application January 30, 1939, Serial No. 253,612

14 Claims. (Cl. 88—17)

This invention relates to motion picture apparatus and particularly to a motion picture projector adapted to project upon a translucent screen a motion picture background scene for combination with a foreground action, both of which are simultaneously photographed from the other side of the screen.

In the production of motion pictures, process shots are well known, such shots consisting of a previously photographed scene which is projected on a screen located behind the actors. It is also well known that rehearsals are made before the final take of any particular scene, and, since such process shots are no exception, the background picture must be repeatedly projected during the rehearsals and also for the final take.

The present invention, therefore, is directed to a background motion picture film projector wherein the projector is made extremely flexible with respect to operation. That is, the film may be run forward or backward at will and at various speeds. This is desirable, since only certain portions of a background film might be rehearsed several times and the present invention permits returning the projector to the beginning of the particular scene quickly without necessitating the dismounting of the film reels and rewinding as was formerly required. According to the invention disclosed hereinafter, the operator of the projector need only manipulate a single switch control handle to quickly bring any point in the reel to the projection gate, thus saving time and money in the production of process shots.

It is also well known that in the taking of this type of shot, the camera and projector shutters must be synchronized so that they are open at the same periods. The present invention not only provides means for aligning the respective shutters, but means whereby the film being projected may be advanced backward and forward between projections without disturbing the original synchronized adjustment.

The principal object of the invention, therefore, is to facilitate the projection of motion picture film.

Another object of the invention is to facilitate the control of a motion picture projector.

A further object of the invention is to control the direction and speed of film travel through a motion picture projector from a single control element.

A further object of the invention is to provide a motion picture projector which projects a picture in synchronism with a motion picture camera and a mechanism which may advance or reverse the film in the projector at will.

A further object of the invention is to disconnect a motion picture projector from its synchronous driving motor, control the speed and direction of the projector while disconnected, and connect the projector back in synchronous position.

Although the novel features which are believed to be characteristic of this invention are pointed out with particularity in the claims appended herewith, the manner of its organization and the mode of its operation will be better understood by referring to the following description read in conjunction with the accompanying drawings forming a part thereof, in which Figure 1 is a diagrammatic drawing of a motion picture process shot employing the projector of the invention;

Figure 2 is an elevational view partially in cross-section of the projector embodying the invention taken along the line 2—2 of Figure 1;

Figure 3 is a cross-sectional view of the clutch and synchronizing mechanism of the projector;

Figure 4 is a detail plan view of Figure 3 taken along the line 4—4 of Figure 3;

Figure 5 is a detail of the clutch taken along the line 5—5 of Figure 3;

Figure 6 is a sectional view on line 6—6 of Figure 7, showing the control switch of the invention;

Figure 7 is a cross-sectional view of the switch taken along the line 7—7 of Figure 6;

Figure 8 is a detail view of the contact segments of the switch taken along the line 8—8 of Figure 7; and Figure 9 is a diagrammatic view of the control switch and circuit of the invention.

Referring now to Fig. 1, the invention is embodied in a projector 5 portably mounted for movement about a stage or set. The projector 5 is shown positioned behind a translucent screen 6, in front of which is shown an actor 7. The background scene on the screen 6 and the actor 7 is photographed by a camera 8 positioned in front of the screen. The projector 5, as stated above, is adapted to project a motion picture film on the screen 6 during the photographing of the picture by the camera 8, the respective shutters of the projector and camera opening and closing in synchronism, since the respective motors are electrically interlocked.

Referring now to the specific mechanism for controlling the film advancement through the projector, reference is made to the remaining figures, in which like elements are identified by the same numerals. The projector as shown in Fig. 2 comprises a base 10 which supports the synchronous main driving motor 11 for advancing the film during projection. The motor is connected to the usual intermittent motion and film reels through a frame adjusting assembly 13 and a clutch 14, power being transmitted to a film reel 17 through a drive shaft 18 and to a film reel 19 through a similar shaft within the housing 20. The intermittent film motion may be of the standard type within a housing 23, projection of the film being made through a lens tube 22, a door mounted on hinges 24 being provided to obtain access to the interior of the projector for threading the film therethrough.

For purposes of this invention, as explained hereinafter, a second motor 15 is employed, this motor either advancing or reversing the film through the projector 5. Thus, the film reels 17 and 19 function as either takeup or supply reels according to the direction of film travel through the projector. To permit the reels to function in this manner, an overrunning clutch mechanism in housing 28 is provided for reel 19 and a similar mechanism shown in cross-section is provided for reel 17.

Referring now to this overrun clutch mechanism shown in cross-section, the shaft 18 is geared to a quill 30 which drives a cupped disc 31 having pawls 32 diametrically positioned thereon. When the reel 17 is to act as a takeup reel, the shaft 18 rotates the disc 31 in a direction so that the pawls 32 positively engage a friction disc member 34, which contacts, through friction discs 35, a plate 36 which is fixed to a shaft 38 rotatable within quill 30 and to which is attached the reel 17. Thus the reel 17 is positively driven as a takeup reel, variations in film reel diameter being compensated for by the slippage between disc 34 and plate 36.

Now, when the reel 17 functions as a supply reel, it is rotated by the pull of the film, slowly when the reel is full, and more rapidly as the film is reeled off. At the same time, the shaft 18 and disc 31 are rotated in an opposite direction but in the same direction as the shaft 38. Since the disc 31 always rotates faster than disc 34, the pawls 32 slide over the disc and it is thus necessary to provide a drag on the reel 17 to prevent the film from piling up. To provide such a drag, pawls 40, fixed to the casing, lock a disc 41 mounted on bearing 41', disc 41 being normally rotatable in the opposite direction through a frictional connection with shaft plate 36 through disc 34. This drag can be varied by adjusting the position of a thumb screw 42 which bears against a compression spring 43. The reel 19 is, of course, provided with a similar reversing mechanism within the casing 28 and has a similar adjusting screw 45. There is also provided a manual adjustment for the reel, such as a knurled screw 46 which is connected to a shaft geared with the shaft of the reel 19.

It is well known that, in order to photograph a projected motion picture on a translucent screen, the picture must be on the screen when the shutter of the camera is opened. It thus becomes necessary to synchronize the respective shutters of the projector and camera. This may be accomplished in the present mechanism by the assembly 13 shown in detail in Fig. 3 wherein the motor 11 drives the projector through a type of fixed differential gears which may be adjusted after the camera and projector motor have been electrically interlocked. The motor shaft 49 has pinned to it by a pin 50, a flange 52 in which are located gears 53 rotatable on shafts 54, the shafts being threaded into nuts 55 within the rim of a flange 56 mounted on the shaft 48 coaxially with shaft 49 and rotatable on bearings 49'. The nuts 55 are not rotatable, but may be bodily moved or revolved within the rim of the flange 56. By turning shafts 54 with handles 60, the gears 53 may be locked in position so that they will not rotate. The gears 53 are in mesh with a ring gear 58 mounted on a collar 52' of flange 56 so that, when the gears 53 are locked, the flange 52 will drive flange 56. However, when the gears are free to rotate, the angular position of flange 52 may be adjusted with respect to flange 56. Thus, if there is a certain out-of-phase condition existing between the shutters of projector 5 and the camera 8 when the respective motors are electrically interlocked, they may be brought into exact synchronism by this adjustment.

Referring again to Fig. 2, the reversing motor 15, mentioned above, comprises a stator 62 and a rotor 63, the latter being mounted on a quill 64 adapted to rotate on bearings 65 interposed between the quill and a shaft 66, the shaft 66 being connected directly to the projector mechanism. The rotor 63 may be connected to the shaft 66 through the clutch mechanism 14 shown in detail in Fig. 3 and which will now be described.

This clutch mechanism is an assembly comprising an H-shaped casting 69 slidable axially on the splined larger diameter portion 70 of shaft 66 between a cupshaped flange 71 driven by motor 15 and a similar flange 72 driven by motor 11. Mounted within the casting 69 are diametrically opposing clutch pins 73 and 74, pin 73 being urged outwardly by a compression spring 75, and pin 74 being urged outwardly in the opposite direction by a compression spring 76. The pin 73 is adapted to be inserted in an aperture 73' in the flange 72 when the casting 69 is in the right-hand position, thereby connecting the shaft 48 driven by motor 11 to the projector shaft 66, while the pin 74 is adapted to be inserted in an aperture 74' in the flange 71 when the casting 69 is in the left-hand position, thereby connecting quill 64 driven by motor 15 to the projector shaft 66. Thus, the clutch may connect the projector to either motor 11 or motor 15, the compression springs 75 and 76 causing the respective pins 73 and 74 to be inserted in respective apertures in case the pins and apertures do not coincide when the clutch is shifted. It is to be noted that a single pin is employed for making the connection between the projector shaft 66 and the respective motors. Now, since the drive is a direct one-to-one ratio, the use of a single pin will maintain synchronism between the camera and projector shutter regardless of the fact that the motor 11 may be periodically connected and disconnected from the projector.

The clutch 14 is operated by the lower end extension 78' of a magnetically operated lever arm 78 pivoted at 79, the end of the extension being set in the smaller diameter portion of the casting 69, as shown in Fig. 5, this view also showing the spring apertures 80 and 80'. The splined interconnection between the shaft 70 and the casting 69 is shown at 81.

The pivoted lever arm 78 is actuated in opposite directions by magnetic coils 84 and 85, the coil 84 shifting the casting 69 to the left to make connection with the motor 15, and the coil 85 shifting the casting to the right, as shown in Fig. 3, to make connection with motor 11. Although the lower portion 78' of the clutch-actuating mechanism is a single element, the remainder of the lever comprises two branches, the top portions of which have shoes 86 and 87 (see Figs. 4 and 9). Mounted between the arms is a magnetic element 89 which is attracted by the magnetic fields of coils 84 and 85 for actuating the lever 78. It is to be noted that the segments 86 and 87 have notches 90 and 91 cut therein for accommodating rollers 94 and 95 which control contacts 96 and 97, respectively. Thus, the position of clutch 14 is determined by that coil (84 or 85) which was last energized. A condenser 98 is connected across the contacts to reduce burning thereof.

The control of the clutch 14 as well as the energization of motor 11 is controlled by a single element in the form of a lever 100 having a handle 101 (see Figs. 6, 7, 8 and 9). This mechanism is in the form of an electrical control box mounted within a housing 104. The lever 100 is mounted for rotation in two directions by being pivoted at a point 105 and being mounted in a casting 106 which rotates on stub shafts 107 and 108. Mounted in an aperture of the casting 106 is a switch 110' having a lever 110 which is adapted to make and break a circuit between two contact points 111 and 112 within the switch 110', depending upon the position of the handle 101 (see Fig. 9). The switch lever 110 may be adjusted by two set screws 113 and 113'.

The lever 100 has mounted thereon a double set of brush contacts 114, 115, 116 and 117, each being urged outwardly by respective compression springs 114' and 116'. Contacts 114 and 115 are electrically interconnected by spring 114', as are contacts 116 and 117 by spring 116'. Contact elements on one side of lever 100, such as 115 and 116, are adapted to contact and slide along metallic segments 120 and 121, while contact 114 is adapted to contact a fixed series of point contacts 122 and 123, while contact 117 is adapted to slide along either one of segments 137 and 141 (see Fig. 6). There is a T-slot 100' in the top portion of housing 104 to permit the lever 100 to be moved in the two directions. The handle 101 moves the contactor elements mounted in lever 100 into a position intermediate the segments 120 and 121 and the contacts 122 and 123, after which the lever may be rotated on its axis 105 in either direction, depending upon the direction and speed of film travel desired. A diagrammatic arrangement of this controlling switch and circuit is shown in Fig. 9, which will now be referred to for a description of the operation of the system.

As mentioned above, the motor 11 is the driving motor which is to operate in synchronism with the motor of camera 8. Motor 11, therefore, may be energized and controlled at a point remote from the projector, such as at the camera. The other motor 15, however, is adapted to advance the film in either direction through the projector. This is accomplished by the control box manipulated by the handle 101. Let us assume that projection has ceased and it is desired to return the film to a certain point. The projector operator first raises the lever 101 in T-slot 100' from the position shown in the dotted lines 120' in Fig. 7 to the position shown in the full lines 120'' in this figure. By this operation, the switch lever 110 is operated so contact is made with point 111, as shown diagrammatically in Fig. 9. With the making of this contact, a circuit is completed from a battery 125, or other suitable source of energy, over conductor 126, through switch 110', through contact 96 (which is closed because the roller 94 is out of the notch 90), over conductor 127, through coil 84 and over conductor 128, back to the battery 125. This energization of the coil 84 pulls the armature 89 to the right, thus shifting the clutch to the left, disconnecting motor 11 and connecting motor 15 to the projector, as above-described. When the armature 89 moves to the right, the roller 94 drops into the notch 90, thus breaking the contacts at 96 and deenergizing the coil 84. At the same time, of course, the roller 95 is raised out of the notch 91, making contacts 97, so that when the switch lever 110 is operated to contact point 112, a circuit is completed from the battery 125, over conductors 130 and 131, and through coil 85 so the clutch will again connect motor 11 to the projector.

Now with the handle 110 in the position shown in Fig. 9, it may be moved in either direction in the T-slot 110' about pivot 105. Movement of the lever to the left, as shown in Fig. 6 by the dotted lines, will energize motor 15 over a circuit from a battery 135, or similar energy source, over conductor 136, segment 137, through interconnected contacts 117 and 116 to segment 121, over conductor 139, through motor 15 (upwardly), over conductor 40, through segment 120, through interconnected contacts 115 and 114, and then through those contacts 122 and resistances 143, depending upon the position of the lever 100, over conductor 144, and back to battery 135. Thus, the motor 15 will rotate in a definite direction since the current is passing from conductor 139 to conductor 140 and the speed thereof will be determined by the position of handle 101 with respect to contacts 122.

The above action will reverse the normal rotation of the projector and rewind the film, thus returning it to its starting point at any speed within the limits of the apparatus. If the starting point is passed, then the handle 101 is moved to the right, completing a circuit from battery 135, over conductor 136, segment 137, over conductor 145, contacts 123 and resistances 146, depending upon the position of the handle 101, interconnected contacts 114 and 115, segment 120, over conductor 140, through motor 15 (downwardly), over conductor 139, segment 121, interconnected contacts 116 and 117, segment 141, over conductor 147, over conductor 144 and back to battery 135. Thus, with the handle 101 to the right, the current through the motor 15 is from conductor 140 to 139, thus reversing the first direction of rotation of the motor and advancing the film in a normal direction. The speed in this direction, of course, will depend upon the number of resistances 146 which are in the circuit with the motor. The handle may thus be shifted from right to left until the proper starting frame of the film is found.

Now, when the handle 101 is brought back to its central position and then dropped down in the T-slot to the position shown in the dotted lines 120' in Fig. 7, the switch 110' will be thrown to contact 112 which will shift the clutch so that the motor 11 is again connected to the mechanism and the motor 15 is disconnected. Thus, it will be observed that a very flexible control for the projector 5 has been provided wherein the drive may be shifted from the regular driving motor to the reversing motor which may be operated in either direction and at various speeds to rewind or advance the film in the projector.

We claim:

1. In combination, motion picture film feed mechanism, driving means for rotating said mechanism in a certain direction, independent driving means for rotating said mechanism in said certain direction and in a reverse direction, means for simultaneously disconnecting one of said driving means from said mechanism when the other of said driving means is connected thereto, said means reconnecting each of said disconnected driving means in the same angular relationship as existed during said first connection, and means for controlling the direction of rotation of said independent driving means and the speed of rotation thereof in any selected direction.

2. In combination, a motion picture film feed mechanism, a driving motor for rotating said mechanism in a certain direction, a second driving motor for rotating said mechanism in said certain direction and in a reverse direction, means for simultaneously disconnecting one of said driving motors from said mechanism when the other of said driving motors is connected thereto, said means reconnecting each of said disconnected driving motors in the same angular relationship as existed during said first connection and a direction and speed control means for said second motor.

3. A combination in accordance with claim 2 in which said disconnecting and connecting means includes a magnetic switch for controlling the connection and disconnection of each of said motors from said feed mechanism.

4. A motion picture projector comprising film advancing mechanism, said mechanism also adapted to advance said film in either direction through said projector, a synchronous driving motor for advancing said film at a substantially constant speed in a certain direction, a second driving means for said film mechanism adapted to advance said film in said certain direction when rotated in one direction, and to reverse the travel of said film when rotated in another direction, a clutch intermediate said synchronous motor and said second driving means adapted to simultaneously connect one and disconnect the other of said motors alternately to said film mechanism, the connection between said mechanism and a respective motor always having the same angular position with respect to each other, and a controller for controlling the direction of rotation and the speed of rotation of said second driving means.

5. A motion picture projector in accordance with claim 4, in which said controller includes a magnetic switch adapted to operate said clutch.

6. A motion picture projector comprising a film advancing mechanism, a drive shaft therefor, a substantially constant speed motor for driving said mechanism, means for obtaining a predetermined angular relationship between the shaft of said driving motor and said drive shaft, a clutch for disconnecting the shaft of said motor from said drive shaft, said clutch reconnecting said shafts in their predetermined angular relationship, a second driving motor for said mechanism, said clutch connecting and disconnecting said second motor from said drive shaft, electrical means for operating said clutch, said electrical means comprising individually actuated energizing circuits, and means adapted to automatically break the last actuated circuit upon actuation of said clutch.

7. A motion picture projector comprising a film advancing mechanism, film reels for said mechanism, a mechanism for operating said reels alternately as supply and takeup reels in accordance with the direction of rotation of said film mechanism, a drive shaft for said mechanism and said film reels, a substantially constant speed motor for said mechanism, a variable speed motor for said mechanism, a clutch intermediate said motors for simultaneously connecting one of said motors while disconnecting the other of said motors, said clutch always connecting a respective motor in the same angular position with respect to said mechanism, and a control box for controlling the connection of said motors to said drive shaft and for changing the speed and direction of rotation of said variable speed motor.

8. A motion picture projector comprising an intermittent film advancing mechanism, a substantially constant speed motor for driving said mechanism, a variable speed motor for driving said mechanism, means for alternately connecting one and disconnecting the other of said motors to said film mechanism, said connected motor being always connected in the same angular relationship with respect to said mechanism and a control box for said variable speed motor, said control box comprising a manually operative handle adapted to first actuate said connecting means for said motors and then change the speed and direction of rotation of said variable speed motor in accordance with the position of said handle.

9. A motion picture projection apparatus comprising a film feed mechanism, a substantially constant speed motor for driving said film feed mechanism, a variable speed motor for driving said film feed mechanism, said variable speed motor being adapted to advance said film forward and backward through said projector at different speeds, and a manually operative controller for said variable speed motor, said controller comprising a manually operative handle movable in directions normal to one another, one direction of movement controlling the simultaneous connection of one and disconnection of the other of said motors from said film feed mechanism, and another direction of movement of said handle being adapted to vary the speed and direction of rotation of said variable speed motor.

10. A controlling system for a motion picture film projector comprising a plurality of driving motors for said projector, one of said motors adapted to drive said projector at a substantially constant speed in a certain direction, and another of said driving motors being adapted to drive said projector at different speeds and in two directions, a drive shaft for said projector, means for connecting each of said motors at mutually exclusive intervals to said drive shaft, one of said motors being disconnected simultaneously with the connection of the other of said motors, and means for remotely controlling said connecting means, said last-mentioned means also controlling the direction and speed of rotation of said projector.

11. A controlling system for a motion picture film projector comprising a plurality of driving motors for said projector, one of said motors adapted to drive said projector at a substantially constant speed in a certain direction, and another of said driving motors being adapted to drive said projector at different speeds and in two directions, a drive shaft for said projector, means for connecting each of said motors at mutually exclusive intervals to said drive shaft, means for remotely controlling said connecting means, said last-mentioned means also controlling the direction and speed of rotation of said projector, and said connecting means including a magnetic clutch, individual energizing circuits therefor, and means adapted upon actuation of said clutch to automatically de-energize the circuit last energized.

12. A motion picture projector comprising a film advancing mechanism, a substantially constant speed motor for driving said mechanism, a second motor for driving said mechanism, a clutch for simultaneously connecting one of said motors while disconnecting the other of said motors from said mechanism and vice versa, means for remotely controlling the actuation of said clutch, said means controlling the direction and speed of rotation of said second motor, and means included in said clutch for connecting each of said motors in the same angular relationship with said mechanism.

13. A motion picture projector comprising a film advancing mechanism, a substantially constant speed motor for driving said mechanism, a second motor for driving said mechanism, a clutch for simultaneously connecting one of said motors while disconnecting the other of said motors from said mechanism and vice versa, and means included in said clutch for connecting each of said motors in the same angular relationship with said mechanism, said last-mentioned means including a movable element coaxially and intermediately arranged with the drive shafts of said motors and adapted to be magnetically shifted between said shafts.

14. A motion picture projector comprising a film advancing mechanism, a substantially constant speed motor for driving said mechanism, a second motor for driving said mechanism, a clutch adapted to simultaneously connect one of said motors to said mechanism while disconnecting the other of said motors from said mechanism and vice versa, means for magnetically shifting said clutch, and a remote control circuit for actuating said magnetic means, said circuit including means for de-energizing said actuating circuit after it has functioned to shift said clutch.

HARRY G. CUNNINGHAM.
JOHN M. WILLSON.